US011489611B2

(12) United States Patent
Oldenbeuving et al.

(10) Patent No.: US 11,489,611 B2
(45) Date of Patent: Nov. 1, 2022

(54) RECONFIGURABLE OPTICAL ADD-DROP MULTIPLEXER WITH LOW POWER CONSUMPTION

(71) Applicant: LioniX International BV, Enschede (NL)

(72) Inventors: Ruud Michiel Oldenbeuving, Enschede (NL); Chris Gerardus Hermanus Roeloffzen, Weerselo (NL); Caterina Taddei, Enschede (NL); René Gerrit Heideman, Oldenzaal (NL)

(73) Assignee: LioniX International BV, Enschede (NL)

( * ) Notice: Subject to any disclaimer, the term of this patent is extended or adjusted under 35 U.S.C. 154(b) by 183 days.

(21) Appl. No.: 17/049,321

(22) PCT Filed: Apr. 23, 2019

(86) PCT No.: PCT/IB2019/053353
§ 371 (c)(1),
(2) Date: Oct. 20, 2020

(87) PCT Pub. No.: WO2019/207487
PCT Pub. Date: Oct. 31, 2019

(65) Prior Publication Data
US 2021/0250116 A1  Aug. 12, 2021

Related U.S. Application Data

(60) Provisional application No. 62/661,292, filed on Apr. 23, 2018.

(51) Int. Cl.
*H04J 14/02* (2006.01)
*G02F 1/03* (2006.01)
(Continued)

(52) U.S. Cl.
CPC ........ *H04J 14/0212* (2013.01); *G02F 1/0316* (2013.01); *G02F 1/212* (2021.01); *G02F 1/3132* (2013.01)

(58) Field of Classification Search
CPC . H04J 14/0212; H04J 14/0201; G02F 1/0316; G02F 1/212; G02F 1/3132;
(Continued)

(56) References Cited

U.S. PATENT DOCUMENTS 6,961,492 B2 *  11/2005  Doerr ................. G02B 6/29355
                                                              385/27
7,142,759 B2     11/2006  Heideman et al.
(Continued)

OTHER PUBLICATIONS

Authorized Officers: Vessiere, Virginie & Inan, Beril, International Search Report and Written Opinion issued in counterpart PCT application No. PCT/IB2019/053353, dated Aug. 9, 2019, 14 pp.
(Continued)

*Primary Examiner* — John Bedtelyon
(74) *Attorney, Agent, or Firm* — Kaplan Breyer Schwarz, LLP

(57) ABSTRACT

An approach for realizing low-power, high-port-count optical switching systems, such as OXCs, WXCs, and ROADMs is presented. Optical switching systems in accordance with the present disclosure include arrangements of frequency-filter blocks, each of which includes a cascaded arrangement of tunable couplers and tunable Mach-Zehnder Interferometers (MZIs) that provides a substantially flat-top broadband transfer function for the frequency-filter block. The tunability for these devices is achieved by operatively coupling a low-power-dissipation phase controller, such as a stress-optic phase controller or liquid-crystal-based phase controller with one arm of the device, thereby enabling control over the coupling coefficient of the device.

15 Claims, 16 Drawing Sheets

(51) Int. Cl.
*G02F 1/21* (2006.01)
*G02F 1/313* (2006.01)

(58) Field of Classification Search
CPC . G02F 1/225; G02F 2201/16; G02B 6/29355; G02B 6/29395; G02B 6/12007
See application file for complete search history.

(56) References Cited

U.S. PATENT DOCUMENTS

| | | |
|---|---|---|
| 7,146,087 B2 | 12/2006 | Heideman et al. |
| 9,221,074 B2 | 12/2015 | Heideman et al. |
| 10,241,352 B2 | 3/2019 | Leinse et al. |

OTHER PUBLICATIONS

Melati Daniele et al., "On-chip continuously tunable optical delay line based on cascaded Mach-Zehnder interferometers", 2018 Optical Fiber Communications Conference and Exposition (OFC), OSA, Mar. 11, 2018, pp. 1-3, Jun. 13, 2018.

\* cited by examiner

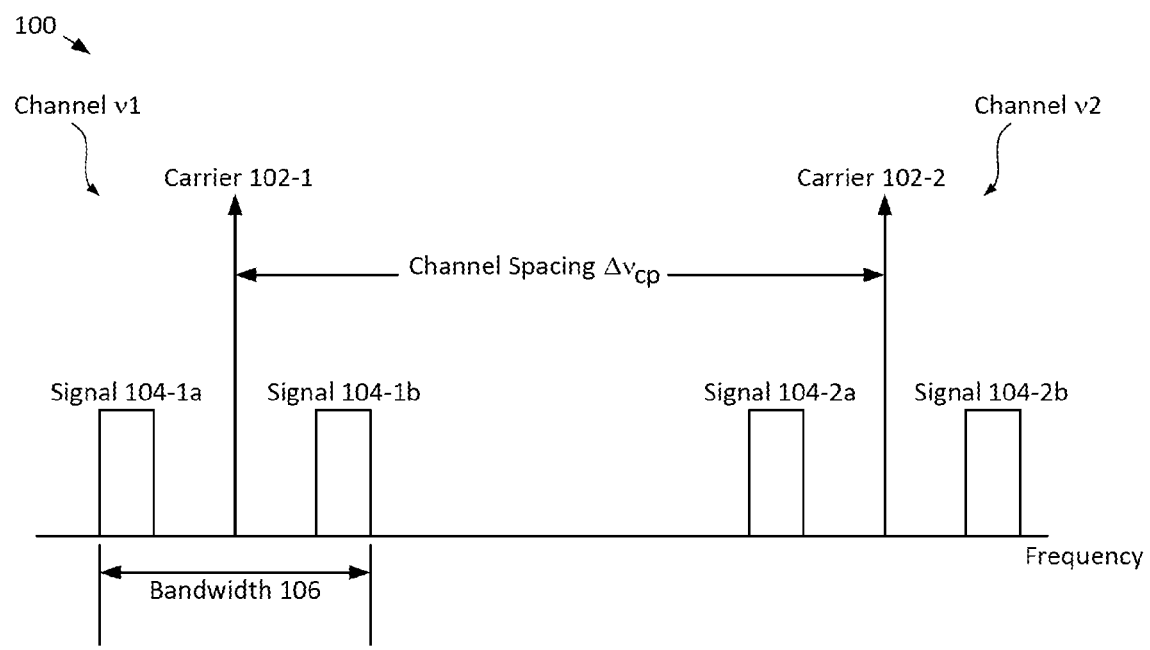

View through line a-a

FIG. 7C
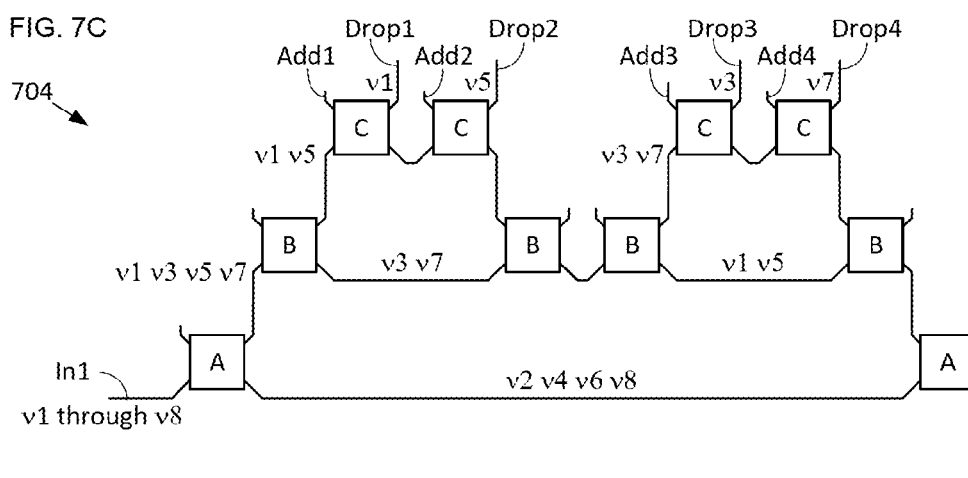
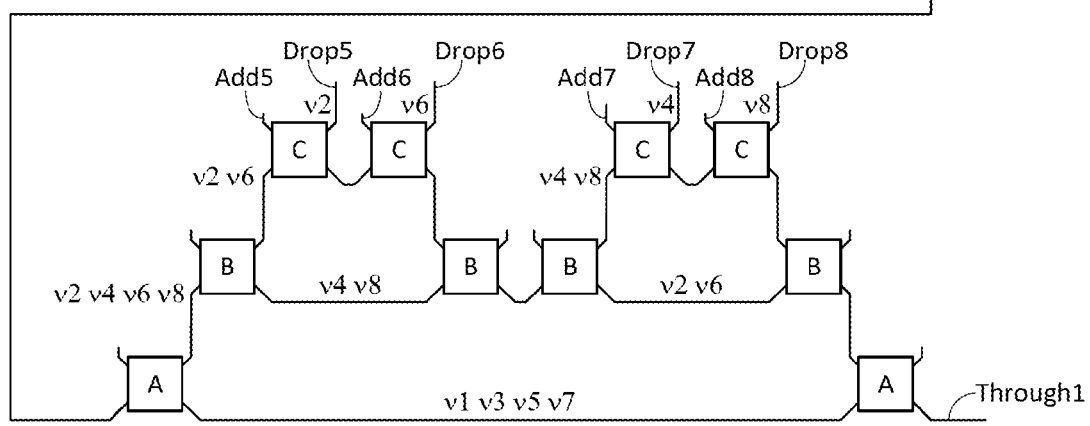

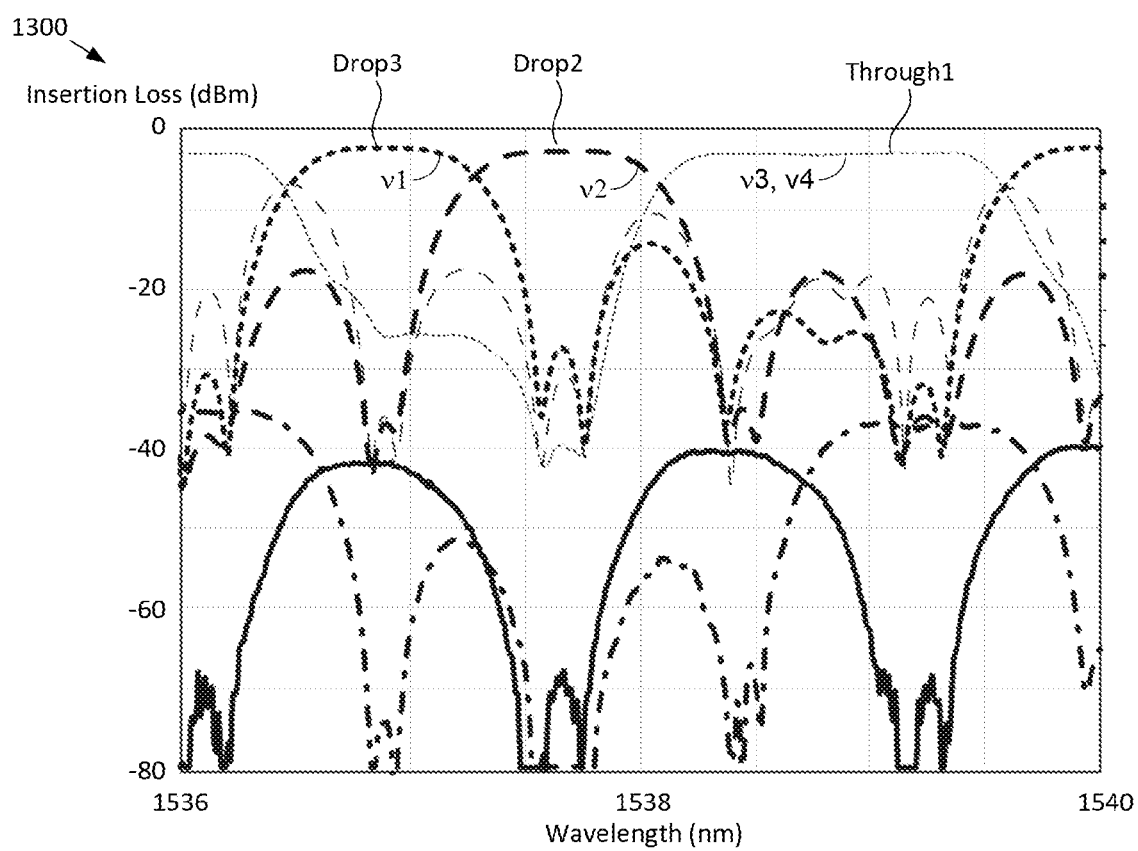

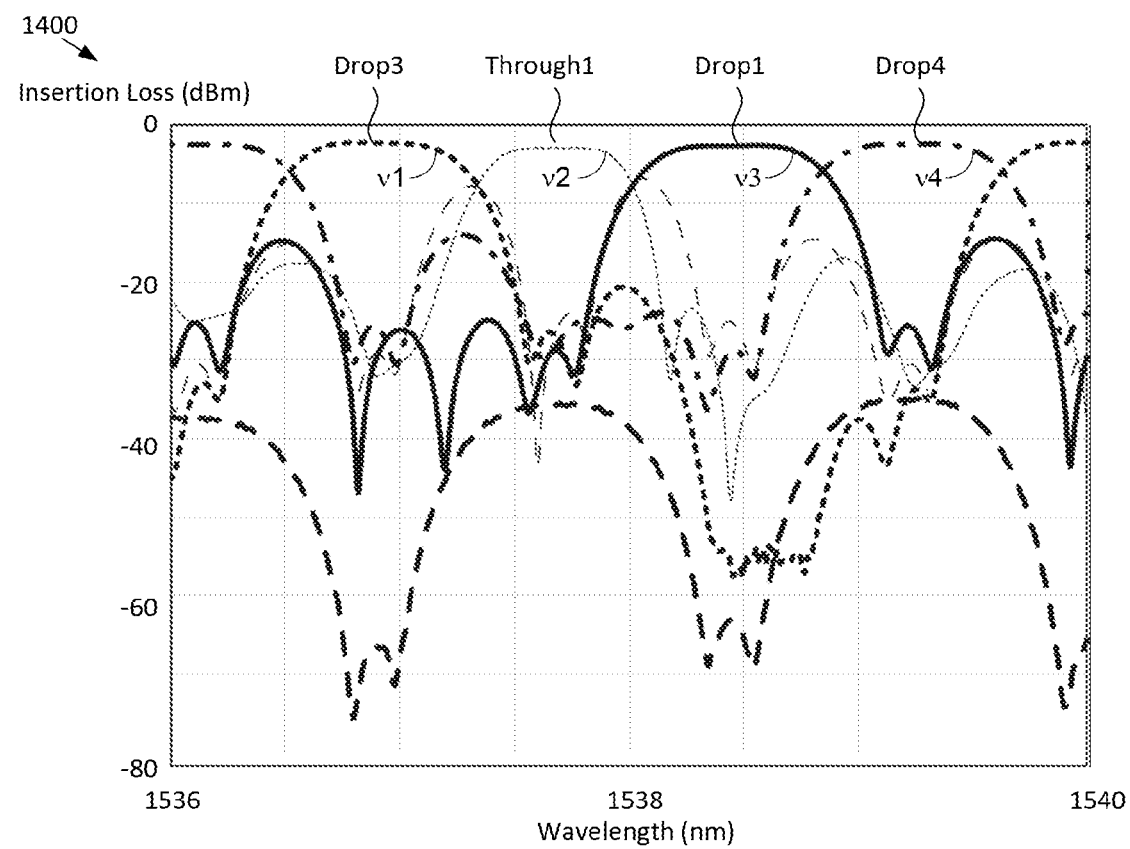

RECONFIGURABLE OPTICAL ADD-DROP MULTIPLEXER WITH LOW POWER CONSUMPTION

CROSS REFERENCE TO RELATED APPLICATIONS

This application claims the benefit of U.S. Provisional Application Ser. No. 62/661,292, filed Apr. 23, 2018, entitled "Reconfigurable Optical Add-Drop Multiplexer with Low Power Consumption" (Attorney Docket: 142-037PR1), which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to integrated-optics in general, and, more particularly, to integrated-optics-based switching systems such as reconfigurable optical add-drop multiplexers and cross-connects.

BACKGROUND

Wavelength-division multiplexing (WDM) communications networks carry composite optical signals through a network of optical fibers with low loss, where a composite signal includes multiple wavelength signals, each carrying different information. The aggregate information bandwidth of such a network depends on the data rate of each wavelength signal and the total number of wavelength signals. Historically, increases in the aggregate bandwidth of WDM networks have been achieved by adding more wavelength signals and/or transmitting the wavelength signals at higher data rates. Unfortunately, practical and technological barriers have made it increasingly difficult and/or expensive to continue to increase network bandwidth in this manner.

An alternative approach for increasing the aggregate bandwidth of a WDM network is to rebalance network capacity as bandwidth demand changes by reconfiguring the wavelength signals among different information signals and pathways through the network without converting them from the optical domain into the electrical domain and back again. Such "all-optical reconfiguration" is performed via one or more optical-circuit switches (e.g., optical cross-connects (OXC), wavelength-selective cross-connects (WXC), reconfigurable optical add-drop multiplexers (ROADM), etc.), which are configured to separate the wavelength channels in an information signal and individually reroute them through the network as desired.

Several technologies have been investigated for use in WDM optical-circuit switches, such as free-space MEMS mirror arrays and liquid crystal on silicon (LCOS), each of which separates a composite signal into its wavelength signal components and steers the wavelength signal from any of M input ports to any of N output ports by directing them through a three-dimensional free-space volume. Unfortunately, these free-space systems are typically quite large, complex, and expensive.

Integrated-optics technology is an attractive alternative to free-space switching systems because it enables more compact systems that are typically also lower cost. An integrated-optics system includes one or more optical waveguides formed on the surface of a substrate. Each so-called "surface waveguide" (also referred to herein as simply "waveguides") includes a light-guiding core surrounded by cladding material that substantially confines a light signal conveyed by the surface waveguide to the core material. The surface waveguides can be combined in myriad arrangements, typically referred to as planar-lightwave circuits (PLCs), to achieve highly complex optical functionality.

Switching elements can be included in a PLC by adding a phase-control element—typically a heater—to a waveguide structure (e.g., a ring resonator or Mach-Zehnder Interferometer (MZI) element, etc.). Unfortunately, heater elements have high power consumption, which has limited the use of integrated-optics-based switching systems in practice—particularly for large-port-count systems.

Furthermore, many switching applications require broad-band operation in which optical signals having different wavelengths within a wide spectral band must be switched with substantially uniform low loss. Unfortunately, ring resonator elements have notoriously narrow filter bandwidths, which limits their utility for broad-band applications. MZIs, while potentially suitable for such broad-band operation, exhibit propagation losses that are wavelength dependent, giving rise to non-uniform transmission bands. In other words, the frequency response of a conventional MZI-based system typically has significant deviation from its mean response over its bandwidth (e.g., a rounded frequency response that falls off toward the edges of the pass band, ripple within its pass band, etc.); therefore, such systems do not exhibit "flat-top responses" (i.e., they do not have "flat-band regions"). As a result, conventional MZI-based systems are normally characterized by significant unwanted loss.

The need for an integrated-optics-based approach suitable for use in broad-band optical switching applications remains, as yet, unmet in the prior art.

SUMMARY

The present disclosure enables optical switching systems without some of the costs and disadvantages of the prior art. Embodiments in accordance with the present disclosure employ (1) frequency-filter blocks having tunable MZI elements that are cascaded between tunable couplers to realize a flat-top frequency response and (2) tuning mechanisms that have low electrical-power dissipation. Embodiments in accordance with the present disclosure are well suited for use in optical switching systems such as OXC, WXC, ROADM, and the like, and are particularly well suited for use in broadband communications systems.

An illustrative embodiment is a ROADM comprising a plurality of frequency-filter blocks, where each block includes three tunable couplers and two tunable MZI, and where each MZI is located between a pair of tunable couplers. The cascaded structure of the tunable couplers and MZIs provides a substantially flat-top broadband transfer function for the block. Each MZI and tunable coupler includes a low-power-dissipation stress-optic phase controller. The phase controller is operatively coupled with one arm of the MZI or tunable coupler, thereby enabling control over the phase of the light traveling though that arm and, thus, control over the coupling coefficient of that device. As a result, complete independent control of the propagation of each wavelength of a WDM signal through the block is achieved without incurring the high-power requirements associated with prior-art integrated-optics based optical switching systems.

By interconnecting appropriately designed blocks, ROADMs capable of managing the propagation of any practical number of wavelength signals can be achieved. In addition, other optical switching systems, such as optical cross-connects, wavelength cross-connects, etc., can be formed in accordance with the present disclosure.

In some embodiments, the phase controller is a low-power phase controller, such as a liquid-crystal-based phase controller or a piezoelectric phase controller.

An embodiment in accordance with the present disclosure is an integrated-optics system comprising a first frequency-filter block, the frequency-filter block including: first and second input ports; first and second output ports; a first Mach-Zehnder Interferometer (MZI); a second MZI; and first, second, and third tunable couplers; wherein the first MZI, second MZI and the first, second, and third tunable couplers are optically coupled and monolithically integrated on a substrate and arranged such that the first MZI is between the first and second tunable couplers and the second MZI is between the second and third tunable couplers; wherein the first frequency-filter block is operative for independently directing each of a first plurality of wavelength signals from the either of the first and second input ports to either of the first and second output ports; and wherein the transfer function of the frequency-filter block has a flat-top response for each wavelength signal of the first plurality thereof.

Another embodiment in accordance with the present disclosure is a method comprising: (1) providing a first frequency-filter block that includes: first and second input ports; first and second output ports; a first Mach-Zehnder Interferometer (MZI); a second MZI; and first, second, and third tunable couplers; wherein the first MZI, second MZI and the first, second, and third tunable couplers are optically coupled and monolithically integrated on a substrate and arranged such that the first MZI is between the first and second tunable couplers and the second MZI is between the second and third tunable couplers; and wherein the transfer function of the frequency-filter block has a flat-top response for each wavelength signal of the first plurality thereof; (2) establishing a first path through the first frequency-filter block for a first wavelength signal of a first plurality of wavelength signals, where the first path includes one of the first and second input ports and one of the first and second output ports; and (3) establishing a second path through the first frequency-filter block for a second wavelength signal of the first plurality of wavelength signals, where the second path includes one of the first and second input ports and one of the first and second output ports, and wherein the first and second paths are independent of one another.

BRIEF DESCRIPTION OF THE DRAWINGS

FIG. 1 depicts a schematic plot of a portion of the frequency response of a broad-band communications system.

FIGS. 7A-D depict schematic drawings of integrated-optics switching systems of different scales in accordance with the present disclosure.

FIG. 13 shows a plot of measured insertion loss for the wavelength signals of input signal 902 for a fourth exemplary routing configuration of system 900.

FIG. 14 shows a plot of measured insertion loss for the wavelength signals of input signal 902 for a fifth exemplary routing configuration of system 900.

DETAILED DESCRIPTION

FIG. 1 depicts a schematic plot of a portion of the frequency response of a broad-band communications system. Plot 100 shows two adjacent channels of a typical broadband channel spectrum. Channel v1 includes carrier signal 102-1 and its associated information signals 104-1a and 104-1b. Channel v2 includes carrier signal 102-2 and its associated information signals 104-2a and 104-2b.

As will be apparent to one skilled in the art, the frequency and wavelength of an optical signal are inherently related. As a result, throughout this disclosure, the terms frequency and wavelength are used substantially interchangeably with respect to signals and signal/filter bandwidths.

In a typical broadband communications system, the bandwidth of each individual channel of a WDM network can be up to 25-30% of the channel spacing. In other words, bandwidth 106 can be as much as 30% of channel spacing $\Delta v_{cp}$. Furthermore, in many applications, it is desirable to process both a carrier signal and its associated information signals (e.g., carrier signal 102-1 and information signals 102-1a and 102-1b, and so on). As a result, a switching system must be able to switch light signals that cover a wide spectral range with little optical attenuation and limited difference in the losses of the different signals. This requirement represents a significant challenge for prior-art integrated-optics elements, such as those based on ring-resonators or a single MZI.

Figure 2A:
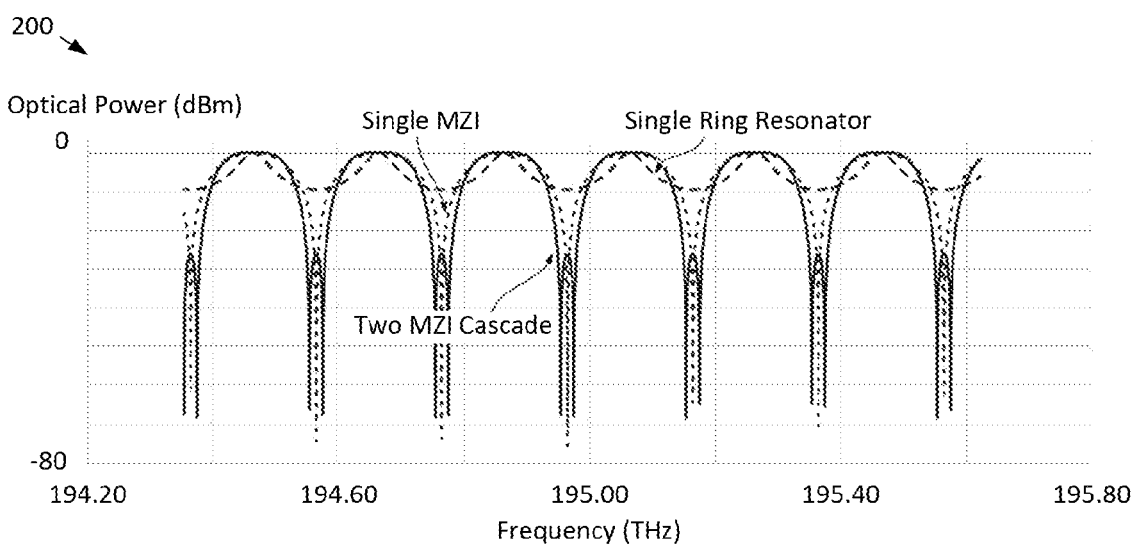
FIGS. 2A-B depict plots of frequency response for a conventional ring-resonator-based filter, a single MZI filter, and a filter comprising a cascaded pair of MZIs over a plurality of free-spectral ranges and over a single free-spectral range, respectively.
Figure 2B:
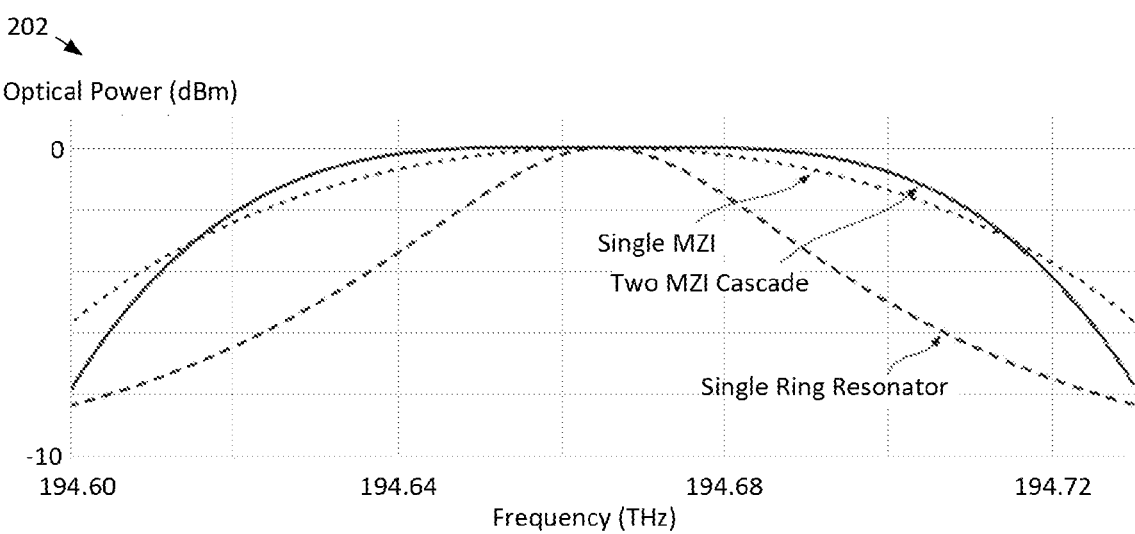

FIGS. 2A-B depict plots of frequency response for a conventional ring-resonator-based filter, a single MZI filter, and a filter comprising a cascaded pair of MZIs over a plurality of free-spectral ranges and over a single free-spectral range, respectively.

Plot 200 shows representative frequency responses of the three filter types over a plurality of free-spectral ranges.

Plot 202 shows an enlargement of a representative frequency response of the different filters at a single resonance frequency.

Often, a prior-art switching system employs tunable ring resonators to couple light between ports of a switching system, such as a ROADM. Unfortunately, as shown in plots 200 and 202, a ring resonator has a filter-bandwidth of only several GHz, while several tens of GHz filter bandwidths are typically needed for broadband communication.

Furthermore, the plots show that a single MZI does not have a flat-top response and would, therefore, result in additional unwanted loss. For the purposes of this Specification, including the appended claims, a "flat-top response" is defined as a frequency response having a pass band that deviates from its mean value (e.g., due to fall-off at the pass-band edges, ripple within the pass band, etc.) by less than or equal to 2.5% (i.e., 0.1 dB). By cascading multiple MZI elements, however, a broader composite frequency response can be attained. To attain a substantially flat-top response though, the path-length-differences and the coupling coefficients of the MZIs' couplers must be very well controlled (within less than 1% accuracy). For example, if the desired coupling coefficient for each MZI in a cascaded set is 0.92, a variation of merely 0.01 for one MZI will result in an unacceptable collective filter response. Unfortunately, such accuracy is not achievable with currently available waveguide platforms because fabrication tolerances (i.e., variations) are too great. Therefore, prior-art ring-resonator-based and MZI-based switching elements have been deemed unsuitable for many, if not all, broadband communications applications.

It is an aspect of the present disclosure, however, that the use of "tunable couplers" can enable a filter response required for broadband operation. For the purposes of the present disclosure, including the appended claims, a "tunable coupler" is defined as an equal-arm-length MZI having a coupling coefficient that can be tuned to a specific value within the range of 0 and 1. The accuracy of the coupling with such an element is limited only by the accuracy of the driver used to control the phase controller of the element (e.g., a heater, stress element, liquid crystal coupling region, etc.). It should be noted that an added benefit of using tunable couplers is that a user can choose to use, or not use, the MZI-filter as desired (i.e., an MZI filter can either simply pass all frequencies or only selected ones).

Figure 3:
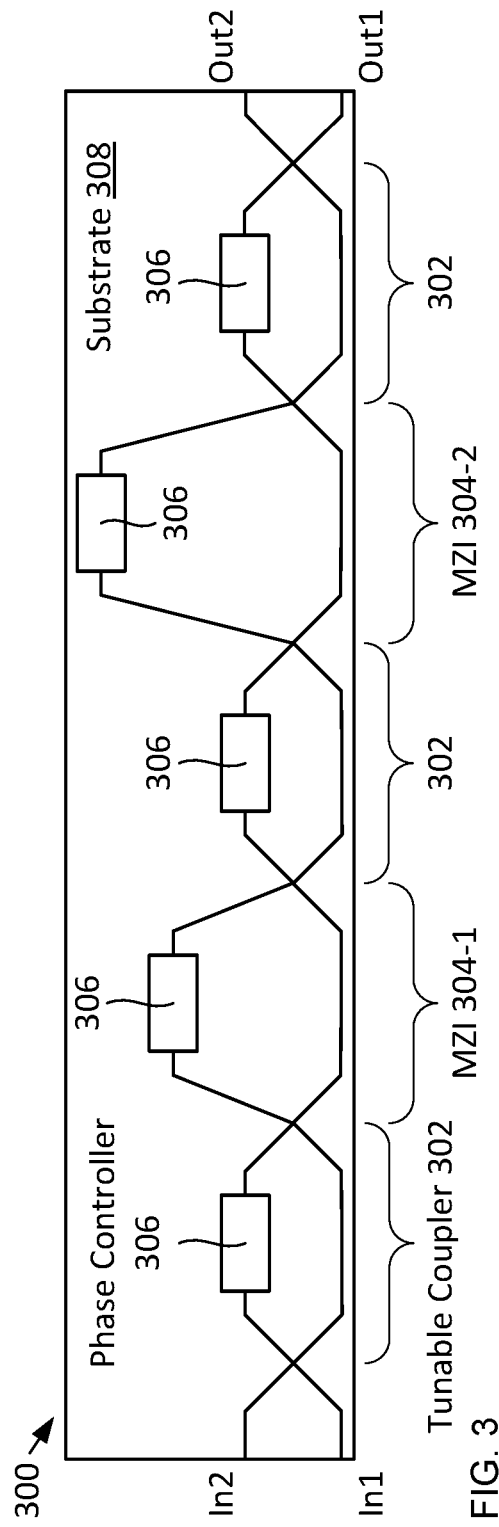
FIG. 3 depicts a schematic diagram of a frequency-filter block in accordance with the present disclosure.

FIG. 3 depicts a schematic diagram of an integrated-optics-based frequency-filter block in accordance with the present disclosure. Frequency-filter block 300 (hereinafter referred to as "block 300") includes three tunable couplers 302, MZI 304-1 and MZI 304-2, where each MZI is located between a pair of tunable couplers. Tunable couplers 302, MZI 304-1 and MZI 304-2 are monolithically integrated on common substrate 308. Block 300 is configured to independently control the optical coupling of any wavelength signal received at either of inputs In1 and In2 with either of outputs Out1 and Out2 with a substantially flat-top response.

Figure 4C:
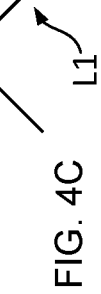
FIG. 4C depicts a schematic drawing of an exemplary MZI structure in accordance with the present disclosure.
Figure 4A:
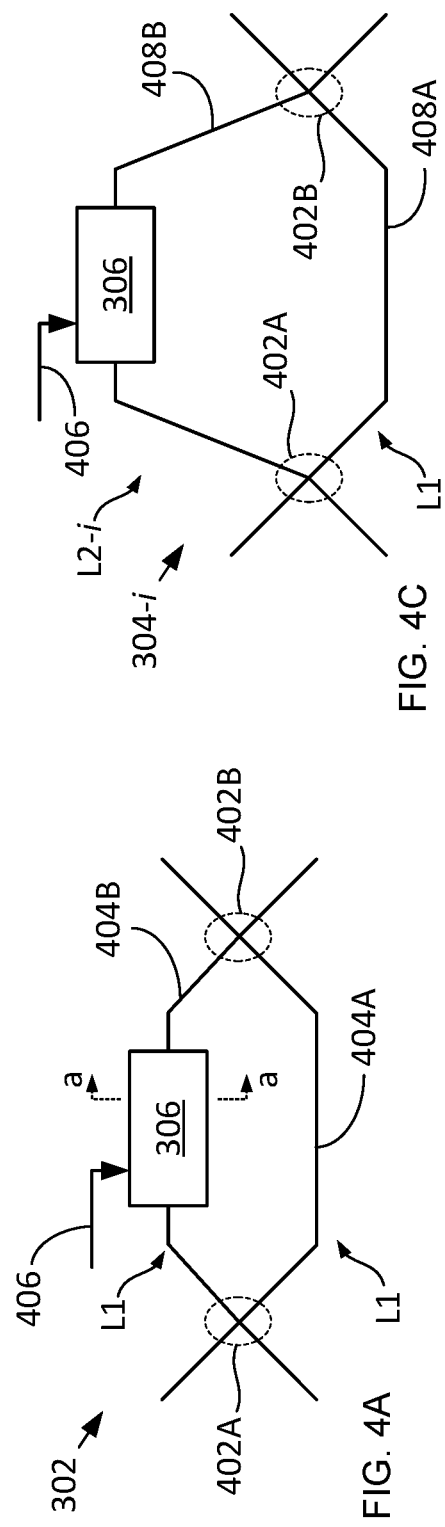
FIG. 4A depicts a schematic drawing of a representative tunable coupler in accordance with the present disclosure.

FIG. 4A depicts a schematic drawing of a representative tunable coupler in accordance with the present disclosure. Tunable coupler 302 is an arrangement of surface waveguides that includes non-tunable directional couplers 402A and 402B, arms 404A and 404B, and phase controller 306.

A light signal entering tunable coupler 302 is split substantially equally into arms 404A and 404B by non-tunable directional coupler 402A and recombined at non-tunable directional coupler 402B. The optical power of the recombined light signal is based on the relative phases of the light portions when they recombine.

Each of arms 404A and 404B is a waveguide having the same length (i.e., length L1).

Phase controller 306 is operatively coupled with arm 404B such that, in response to control signal 406, it can impart a desired phase delay on the light signal portion in arm 404B to realize a coupling coefficient having any value within the range of 0 and 1. Phase controller 306 is described in detail below and with respect to FIG. 5.

Figure 4B:
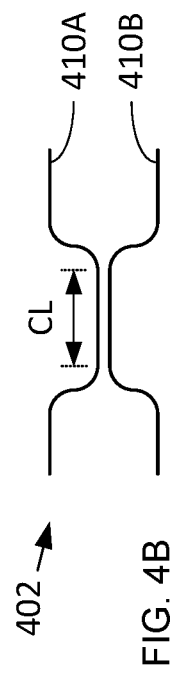
FIG. 4B depicts a schematic drawing of an exemplary non-tunable directional coupler in accordance with the present disclosure.

FIG. 4B depicts a schematic drawing of an exemplary non-tunable directional coupler in accordance with the present disclosure. Non-tunable directional coupler 402 is a conventional directional coupler whose coupling coefficient is fixed. In other words, non-tunable directional coupler 402 is analogous to tunable coupler 302; however, neither of arms 410A and 410B is operatively coupled with a phase controller. As a result, a light signal injected into either of arms 410A and 410B evanescently couples into the other of the arms within coupling region CL such that the optical energy of the light signal is theoretically distributed substantially equally in both arms after passing through the directional coupler.

As would be apparent to one skilled in the art, however, the distribution of optical energy in the arms of a conventional (i.e., non-tunable) directional coupler is strongly dependent upon the actual dimensions of the arms and the separation between them within coupling region CL. As a result, any variation from their designed values due, for example, to variation arising from fabrication tolerances, degrades the equal distribution of the optical energy into arms 410A and 410B, thereby making a frequency-filter, such as block 300, impractical using only conventional non-tunable directional couplers.

It is an aspect of the present disclosure, however, that the inclusion of a tunable coupler 302 on each side of MZI 304-1 and MZI 304-2 enables compensation of the fabrication-based coupling-coefficient variation of non-tunable directional couplers 402, making high-performance integrated-optics-based frequency-filter blocks practical and realizable.

FIG. 4C depicts a schematic drawing of an exemplary MZI structure in accordance with the present disclosure. MZI 304-$i$ is analogous to tunable coupler 302; however, arms 408A and 408B are waveguides having different lengths between non-tunable directional couplers 402.

MZI 304-1 and 304-2 are designed such that the difference in the lengths of their arms is unequal (i.e., L1 and L2-$i$ are different). Preferably, the lengths of the arms in MZI 304-1 and 304-2 are selected such that they give rise to a free-spectral range (FSR) for the MZIs that are related by a factor of two. In the depicted example, the FSR of MZI 304-1 is twice that of the FSR of MZI 304-2. In some alternative embodiments, the FSR of MZI 304-1 is one-half of MZI 304-2. Furthermore, in some embodiments, neither of MZI 304-1 and 304-2 has an arm whose length is that of the arms of tunable coupler 302 (i.e., L1).

Because of the tunable couplers included in block 300, MZI 304-1 and MZI 304-2 can be "switched off." In this state, a complete channel vi (i.e., carrier 103-$i$ and its associated information signals 104-1$a$ and 1041-$b$) injected into input port In1 will propagate straight through the block to emerge at output port Out1. In other words, the channel is not switched to output port Out2. In similar fashion, an alternative channel vi' injected into input port In2 will also propagate straight through the block to emerge at output port Out2, rather than being added to the output signal that emerges at output port Out1.

It should be noted that integrated-optics phase shifters known in the prior art are typically based on the thermo-optic effect. In such a phase controller, a heater disposed on a waveguide structure is provided a control signal that gives rise to an electric current that flows through the heater. The magnitude of the current is controlled to control the temperature within the waveguide portion below the heater. The speed at which light propagates through the heated waveguide region is a function of temperature; therefore, a desired phase delay can be imparted on a light signal passing through the waveguide operatively coupled with the phase controller by heating the waveguide to the proper temperature.

Unfortunately, such prior-art integrated-optics phase shifters dissipate a great deal of electrical power, since the electric current must be maintained to realize the desired amount of ohmic heating. For example, block 300 includes a cascaded filter comprising a "tunable coupler, MZI, tunable coupler, MZI, tunable coupler" sequence that includes a total of five phase controllers 306. For a block 300 that includes waveguides formed in the TriPleX waveguide technology (described in detail in U.S. Pat. Nos. 7,146,087 and 7,142,759, each of which is incorporated herein by reference), for example, the average electrical-power consumption is approximately 2.5 W. As a result, power dissipation concerns have limited the practical size of prior-art integrated-optics switching systems.

Table 1 below lists the number, n, of blocks 300 required as the scale of a wavelength-switching system increases.

As seen from Table 1, for a modest wavelength switching system, such as a 32-wavelength ROADM, that employs thermo-optic phase-shifters, aggregate power dissipation exceeds 100 W.

Currently available commercial ROADM typically offer a range of forty wavelengths to be added/dropped. A forty-wavelength switching system employing thermo-optic phase-shifter-based blocks 300, therefore, would have an aggregate power consumption of roughly 200 W.

TABLE 1

Scaling and power dissipation for optical-frequency add/drop systems based on thermo-optic-phase-shifter-based switching elements as a function of the number of optical wavelengths switched.

| n | #wavelengths operated on | # blocks | # heaters | Thermal Phase-Shifter Ave. Total Power (W) |
|---|---|---|---|---|
| 1 | 2 | 2 | 10 | 2.5 |
| 2 | 4 | 8 (or 6*) | 40 (or 30) | 10 (or 9) |
| 3 | 8 | 20 (or 18*) | 100 (or 90) | 25 (or 24) |
| 4 | 16 | 42 (or 40*) | 210 (or 200) | 52.5 (or 51.5) |
| 5 | 32 | 88 (or 86*) | 440 (or 430) | 110 (or 109) |
| n | $2^n$ | $x = 2^{(n-1)} \cdot \left(2 + \sum_{m=0}^{n-1} \frac{2}{2^m}\right)$ or* $y = x - 2$ | $q = 5 \cdot x$ or* $q = 5 \cdot y$ | $q \cdot 0.25$ |

*indicates systems based on parallel arrangements of blocks to reduce component count, as discussed below and with respect to FIG. 9.

It should be noted that power dissipation could be significantly lower (as low as 0.25 W per block) for switching elements based on integrated-optics waveguides formed in different waveguide technologies; however, the aggregate power dissipation of any reasonably large system, such as a ROADM, would still be prohibitive.

It is an aspect of the present disclosure, however, that employing relatively lower-power phase shifters in block 300 enables practical, large-scale broadband switching systems to be realized. Low-power integrated-optics phase controller in accordance with the present disclosure include stress-optic phase controllers, liquid-crystal integrated-optics phase controllers, and the like. For the purposes of the present disclosure, including the appended claims, a "low-power phase controller" is defined as a phase controller that can exhibit a $2\pi$ phase shift on an optical signal while dissipating no more than 0.05 W of electrical power. As a result, a "low-power block 300" dissipates no more than 0.25 W of electrical power in total.

Figure 5:
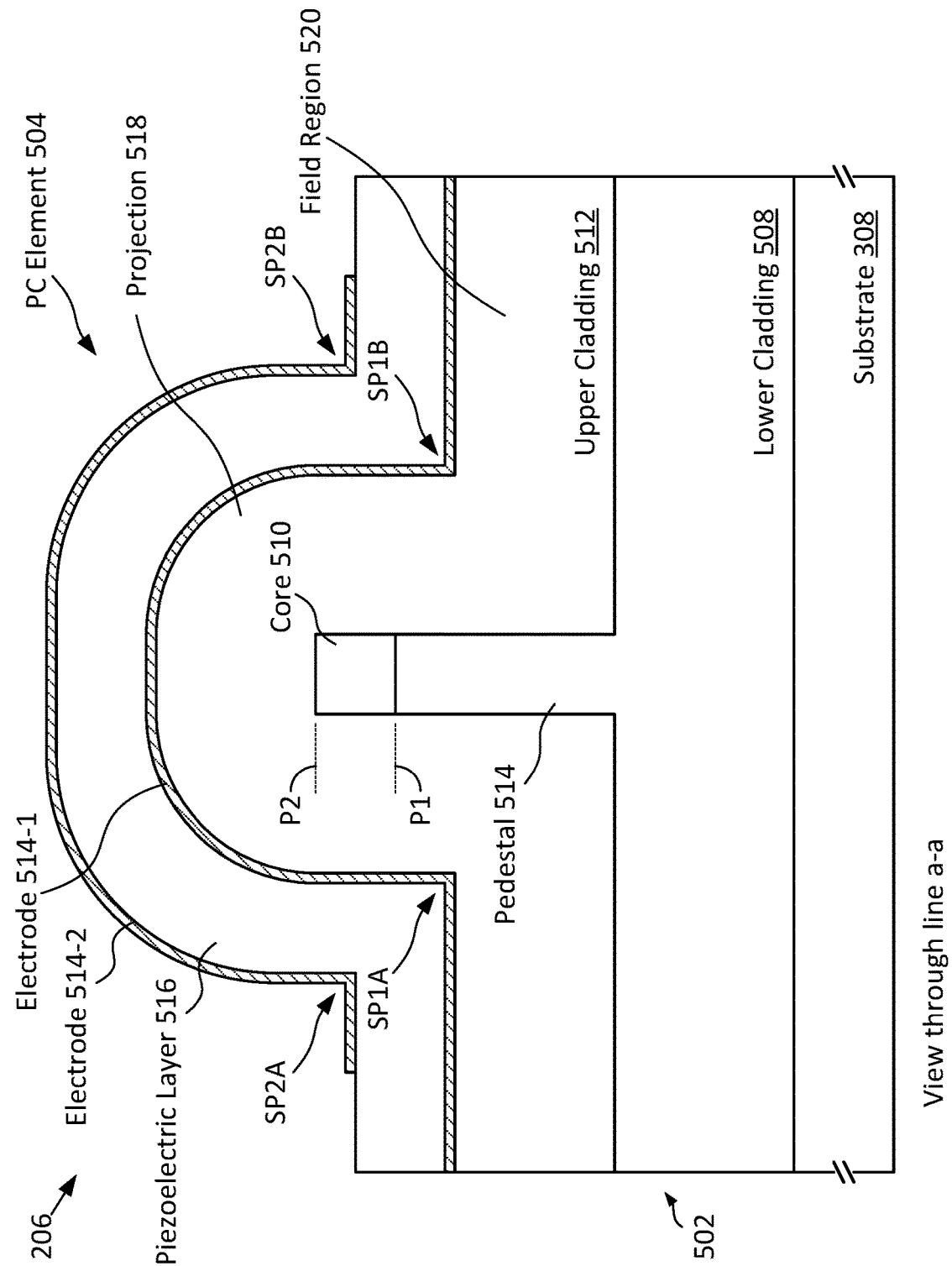
FIG. 5 depicts a schematic drawing of a cross-sectional view of phase controller 306.

FIG. 5 depicts a schematic drawing of a cross-sectional view of phase controller 306. The view of phase controller 306 is taken through line a-a depicted in FIG. 4A. Phase controller 306 is a low-power stress-optic phase controller that is analogous to stress-optics phase controllers described in U.S. Pat. No. 9,221,074 and U.S. patent application Ser. No. 15/875,340, each of which is incorporated herein by reference.

Phase controller 306 includes waveguide structure 502 and phase-control (PC) element 504.

Waveguide structure 502 is that of a TriPleX waveguide having core 510 residing on pedestal 514, which is formed in lower cladding 508. The features of core 510 extend vertically from plane P1, where it meets pedestal 514 to plane P2.

In the depicted example, core 510 is a multi-layer core that includes two silicon nitride layers that are above and below a silicon dioxide layer (typically referred to as a "double-stripe" waveguide).

Lower cladding 508 is a layer of silicon dioxide having sufficient thickness to mitigate optical coupling of light in the core with substrate 308.

Upper cladding 508 is another layer of silicon dioxide formed in conformal fashion over pedestal 514 and core 510 to define projection 518 and field region 520.

The materials and geometry of waveguide structure 502 are selected to enable it to guide any channel vi with the channel spectrum of a broad-band communications system. It should be noted that waveguide structure 502 can include any of a wide range of materials and/or have a different waveguide structure without departing from the scope of the present disclosure.

PC element 504 is a stress-inducing element comprising piezoelectric layer 516 and electrodes 514-1 and 514-2, which reside below and above the piezoelectric layer. Preferably, the shape of PC element 504 substantially matches the shape of the mode field propagating through waveguide 502 such that it includes stress-concentration points SP1A, SP1B, SP2A, and SP2B, which function to direct stress tensors toward core 308. Stress-concentration points SP1A, SP1B, SP2A, and SP2B are formed at the transition between pedestal 518 and field region 520 and, preferably, at least one of the stress-concentration points resides at or below a feature of core 510 (i.e., at least one stress-concentration point is no further from substrate 308 than plane P2).

Although the illustrative embodiment includes a waveguide structure having a multi-layer core that defines a double-stripe waveguide, the present invention is suitable for use with virtually any waveguide structure that includes suitable core structure and/or materials. Other waveguide structures suitable for use in embodiments of the present invention include, without limitation: single-layer-core waveguides whose cores include a dielectric material (e.g., silicon nitride, doped or undoped silicon oxide, silicon oxynitride, etc.), a semiconductor or semiconductor compound, (e.g., silicon, a compound semiconductor, silicon carbide, silicon germanium, etc.), and the like; multi-layer waveguides whose cores comprise one or more dielectric materials, one or more semiconductor materials, combinations of dielectric and semiconductor materials, and the like.

It should be noted that the use of a stress-optic phase controller, while enabling low-power consumption, can result in an increase in the required footprint for an integrated-optics system because the interaction length required to effect a complete $2\pi$ phase shift can be quite long (several times that of a heater-based phase controller). However, embodiments in accordance with the present disclosure that are based on a high-contrast waveguide structure (e.g., TriPleX™ waveguides, silicon-core waveguides, etc.) can have additional advantages over the prior art because high-contrast waveguides have a small minimum bend radius and high maximum packing density that enables waveguide layouts (e.g., serpentine paths, spirals, etc.) that can reduce the real estate required for a stress-optic phase controller. In addition, TriPleX™ waveguides have very low propagation loss, which enables long interaction lengths without significant additional optical loss.

Figure 6:
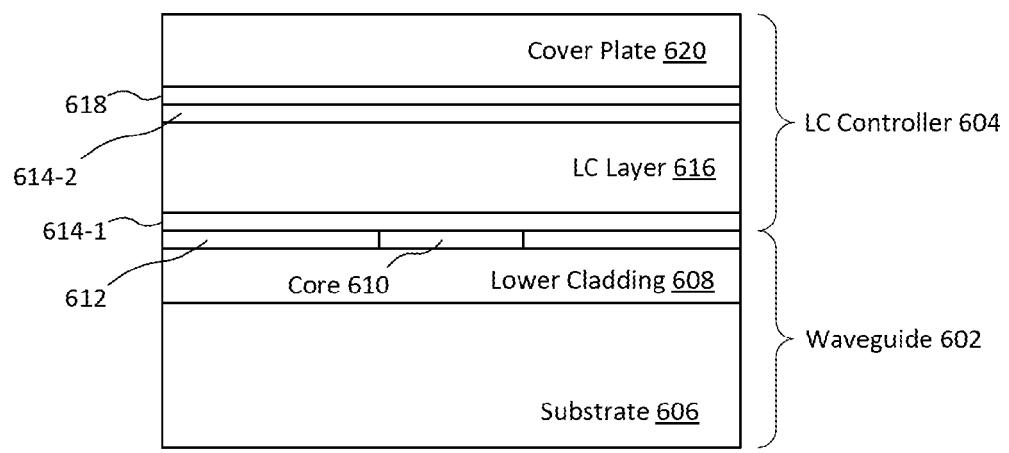
FIG. 6 depicts a schematic drawing of an alternative low-power phase controller in accordance with the present disclosure.
Figure 7A:
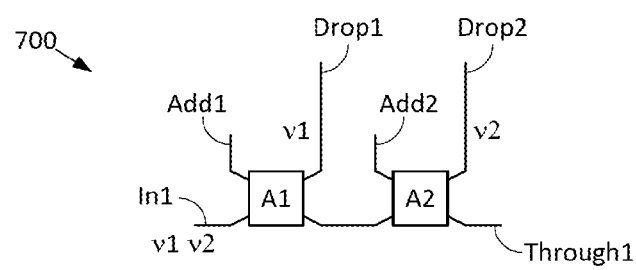
Figure 7B:
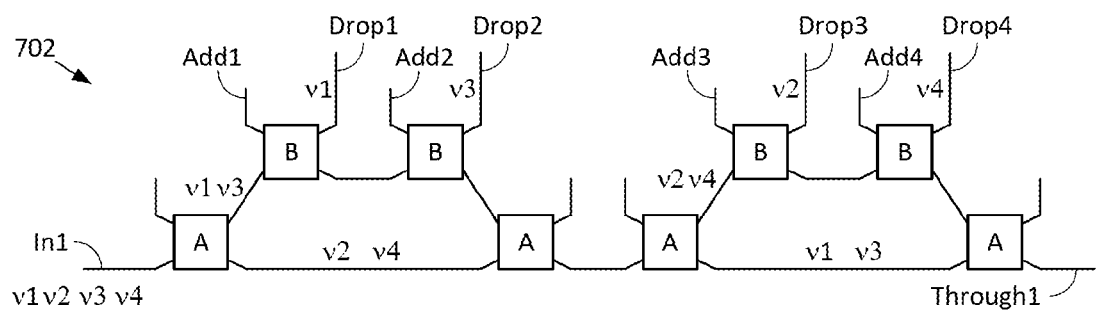
Figure 7D:
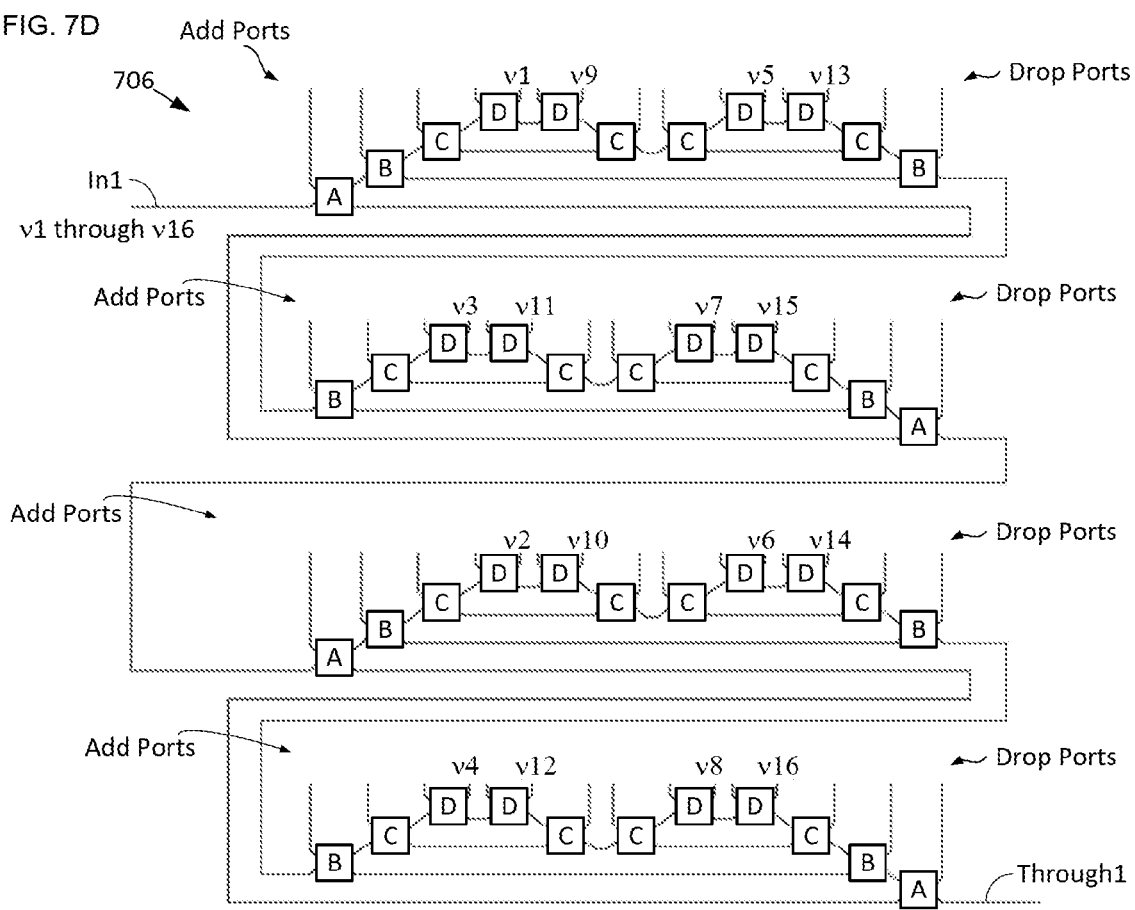

FIG. 6 depicts a schematic drawing of an alternative low-power phase controller in accordance with the present disclosure. Phase controller 600 is a liquid-crystal-based phase controller that includes partial waveguide 602 and liquid-crystal (LC) element 604.

Waveguide 602 is analogous to waveguide 502 described above; however, lower cladding 608 does not include a pedestal. In addition, substrate 606 is optionally made conductive so that it can act as the lower electrode for the liquid crystal structure. Furthermore, no conventional upper cladding is included in waveguide 602 because LC element 604 functions as the upper cladding of the structure.

Core 610 is analogous to core 510 described above. Core 610 resides within planarization layer 612, which is a layer of silicon dioxide having the same thickness as the core.

LC element 604 is a liquid crystal structure disposed on core 610. LC element 604 includes LC alignment layers 614-1 and 614-2, which reside below and above liquid-crystal layer 616.

Electrode 618 is a layer of electrically conductive material disposed on upper LC alignment layer 614-2.

Cover plate 620 is a conventional glass sheet disposed on upper electrode 618.

In response to control signal 406, provided between electrode 618 and substrate 606, LC element 604 responds to induce a desired phase shift in a light signal propagating through core 610.

It should be noted that phase controller 306 and 600 are merely two examples of low-power phase controllers for inducing a phase shift on a light signal in a waveguide in accordance with the present disclosure. Furthermore, in some embodiments, frequency-filter block 300 includes phase controllers that are:

i. stress-optic phase controllers; or
ii. liquid-crystal-based phase controllers; or
iii. thermo-optic phase controllers; or
iv. any combination of i, ii, and iii.

FIGS. 7A-D depict schematic drawings of integrated-optics switching systems of different scales in accordance with the present disclosure.

Systems 700, 702, 704, and 706 are examples of ROADM for operation with 2, 4, 6, and 16 communications channels, respectively. Each of blocks A, B, C, and D is analogous to block 300 described above; however, each of blocks A, B, C, and D is configured with a free-spectral range suitable for handling the spectral range required by its particular system. For example, block A has an FSR equal to $2 \times \Delta v_{cp}$ (as shown in FIG. 1), block B has an FSR equal to $4 \times \Delta v_{cp}$, block C has an FSR equal to $8 \times \Delta v_{cp}$, and block D has an FSR equal to $16 \times \Delta v_{cp}$.

In operation, system 700 receives a multi-wavelength signal comprising channels v1 and v2 at input port In2. Blocks A1 and A2 are controlled, as described above and with respect to block 300, to independently direct each of channels v1 and v2 to the desired one of ports Through1, Drop1, and Drop2. In the depicted example, control signals 406 (not shown) are provided to their respective phase controllers 306 (not shown) such that channel v1 is directed to port Drop1 and channel v2 is directed to port Drop2.

Although not shown, system 700 can also be configured to enable the addition of a replacement channel for one or both of channels v1 and v2 at either of ports Add1 and Add2. It should be noted that ports In1, Add1, and Drop1 of block A1 are analogous to ports In1, In2, and Out2 of block 300, respectively. In similar fashion, ports Add2, Drop2, and Through1 of block A2 are analogous to ports In2, Out2, and Out1 of block 300, respectively.

As will be apparent to one skilled in the art, after reading this Specification, the operation of systems 702, 704, and 706 and the interconnection of their respective blocks A, B, C and D, is analogous to the description provided above for system 700.

Systems 700 through 706 have significant advantages over prior-art integrated optical switching systems because no waveguide crossings are required, enabling operation with lower optical loss. In addition, add-drop functionality is easily realized because when a channel (e.g., v1) is dropped, a different modulated signal at the same frequency can be added.

It should be noted, however, that it is preferable that the communications channels are equally spaced, such as the standard communications channels of the International Telecommunication Union (ITU) grid. Furthermore, the frequencies indicated in FIGS. 7A-D provide indications of light-flow; however, the systems are not limited to the exact layouts depicted. For example, in system 702, the "dropped" frequencies are shown in the order of v1, v3, v2, v4 but other orders are also possible, such as v3, v1, v2, v4.

Figure 8:
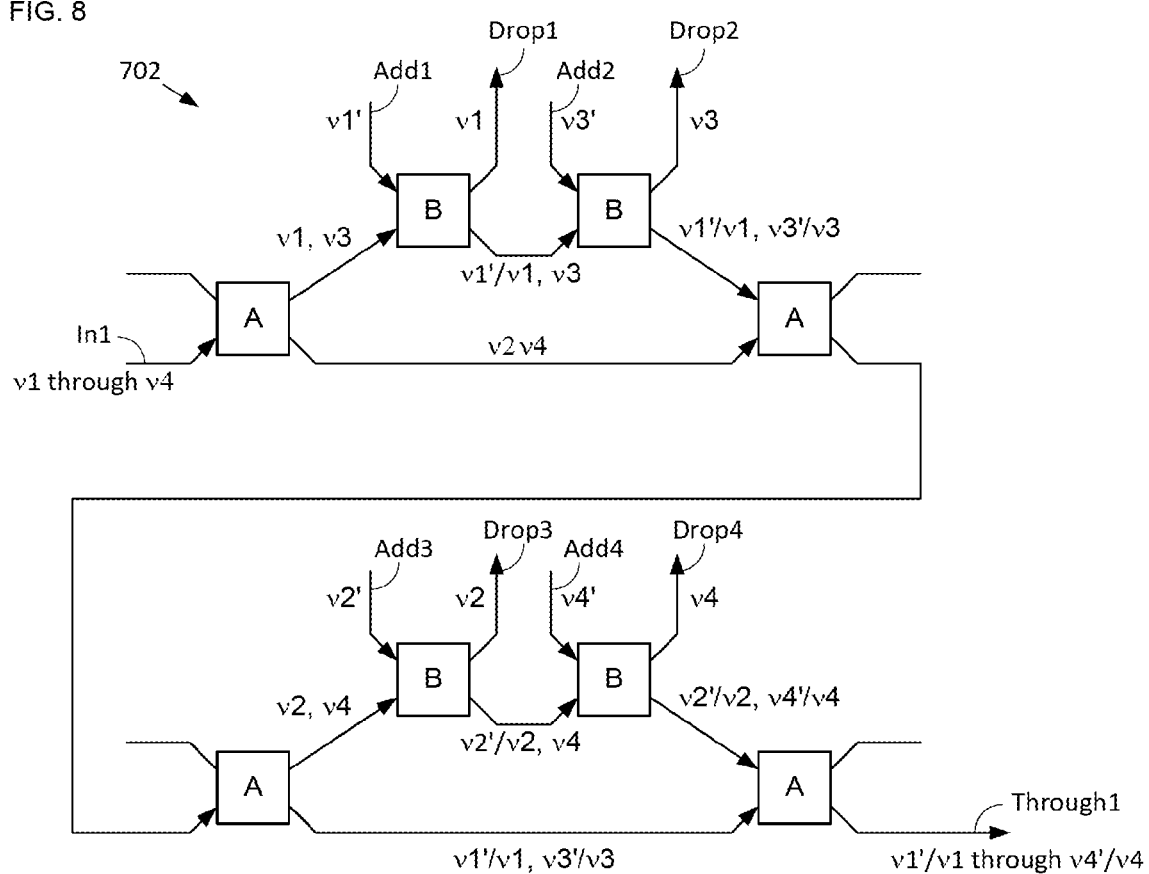
FIG. 8 depicts an exemplary flow of light for add-drop operation of system 702.

FIG. 8 depicts an exemplary flow of light for add-drop operation of system 702.

Figure 9:
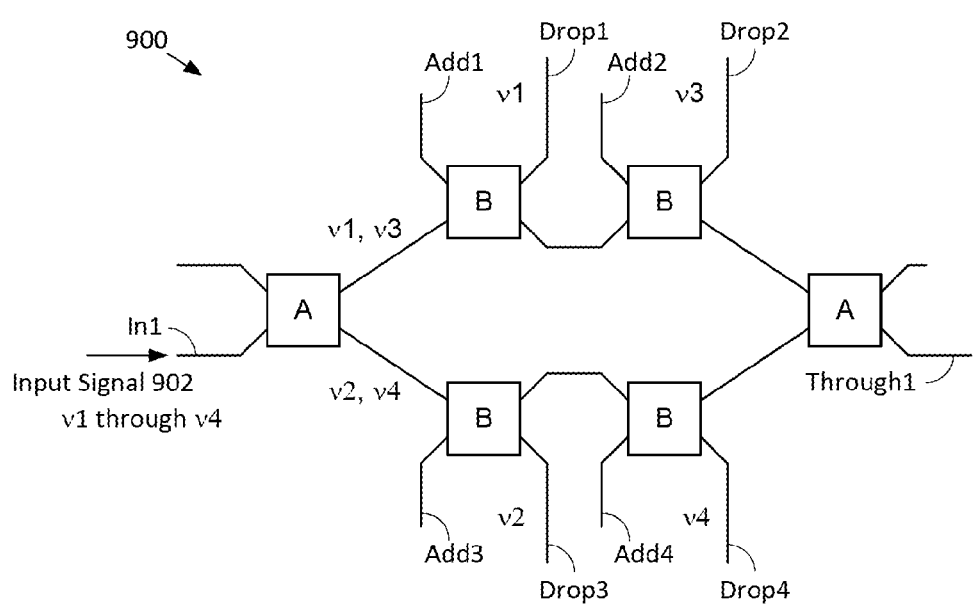
FIG. 9 depicts an alternative arrangement of a 4-channel ROADM system.

FIG. 9 depicts an alternative arrangement of a 4-channel ROADM system. System 900 is analogous to system 702; however, system 800 is configured in a serial arrangement of blocks, which the blocks of system 900 are arranged in a parallel arrangement that requires fewer blocks to realize the same functionality.

Figure 10:
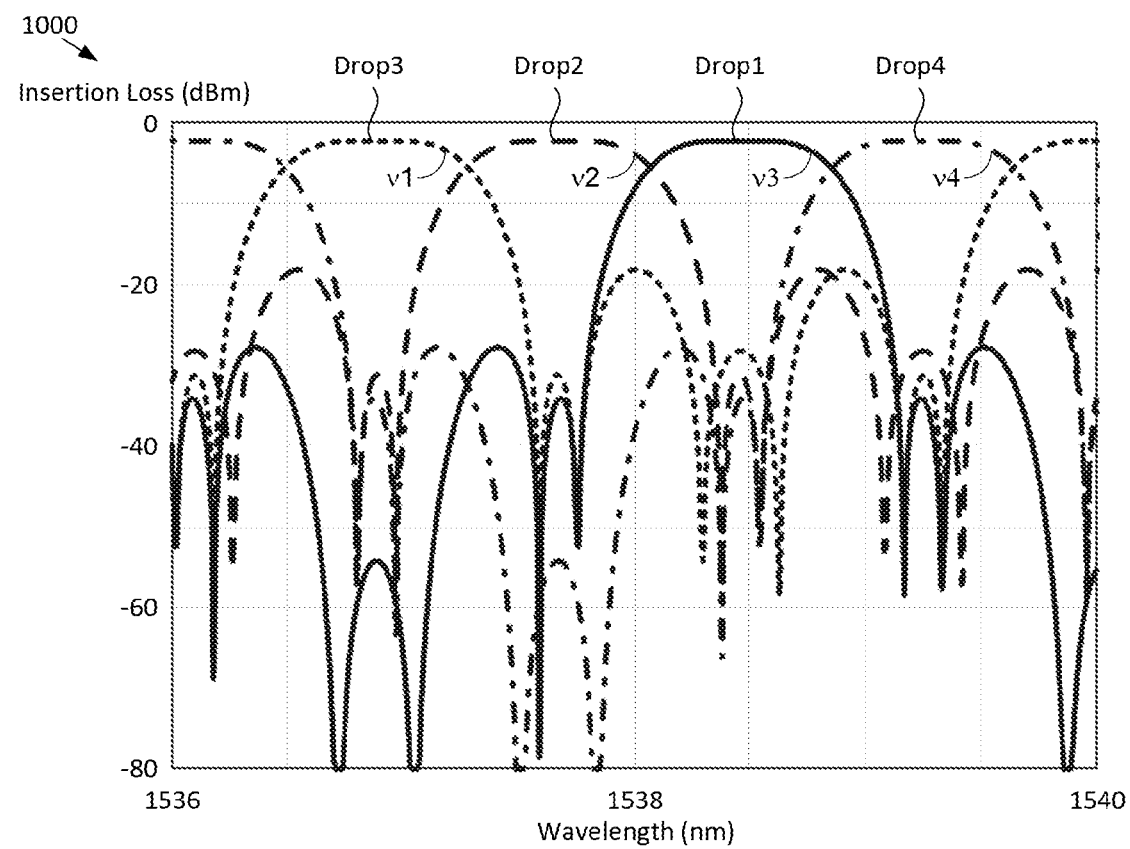
FIG. 10 shows a plot of measured insertion loss for the wavelength signals of input signal 902 for a first exemplary routing configuration of system 900.

FIG. 10 shows a plot of measured insertion loss for the wavelength signals of input signal 902 for a first exemplary routing configuration of system 900. Input signal 902 is received at port In2 of system 900. Input signal 902 is a four-wavelength WDM signal comprising wavelength signals v1, v3, v2, and v4. Each wavelength signal is dropped at a different one of ports Drop1, Drop2, Drop3, and Drop4, as indicated. Specifically, as seen in plot 1000, wavelength signals v1, v3, v2, and v4 are dropped at ports Drop3, Drop2, Drop1, and Drop4, respectively. Furthermore, plot 900 indicates that the wavelength signals are subjected to low propagation loss as they travel through system 900. Furthermore, each wavelength signal has a wide flat-top response.

Figure 11:
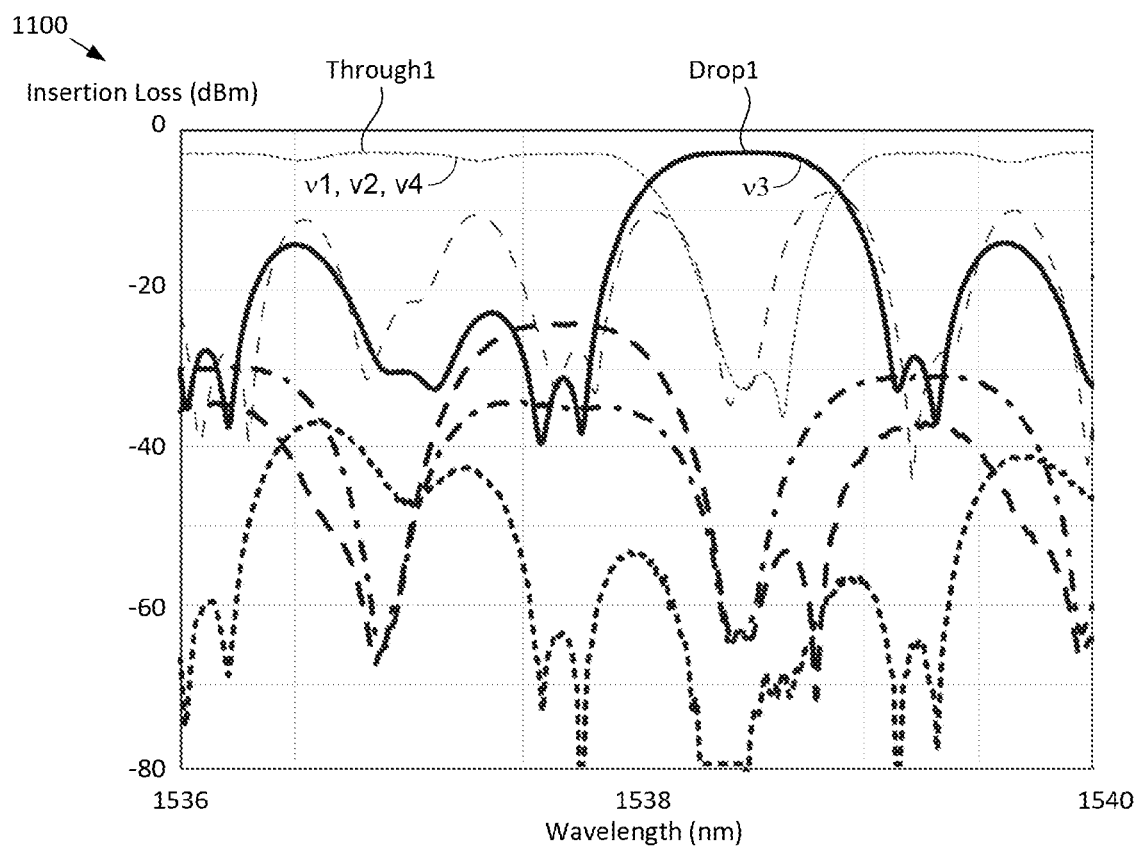
FIG. 11 shows a plot of measured insertion loss for the wavelength signals of input signal 902 for a second exemplary routing configuration of system 900.

FIG. 11 shows a plot of measured insertion loss for the wavelength signals of input signal 902 for a second exemplary routing configuration of system 900. As seen in plot 1100, in the second exemplary configuration, only wavelength signal v3 is dropped from input signal 902 by routing it to port Drop1, while the remaining wavelength signals are directed to port Through1.

Figure 12:
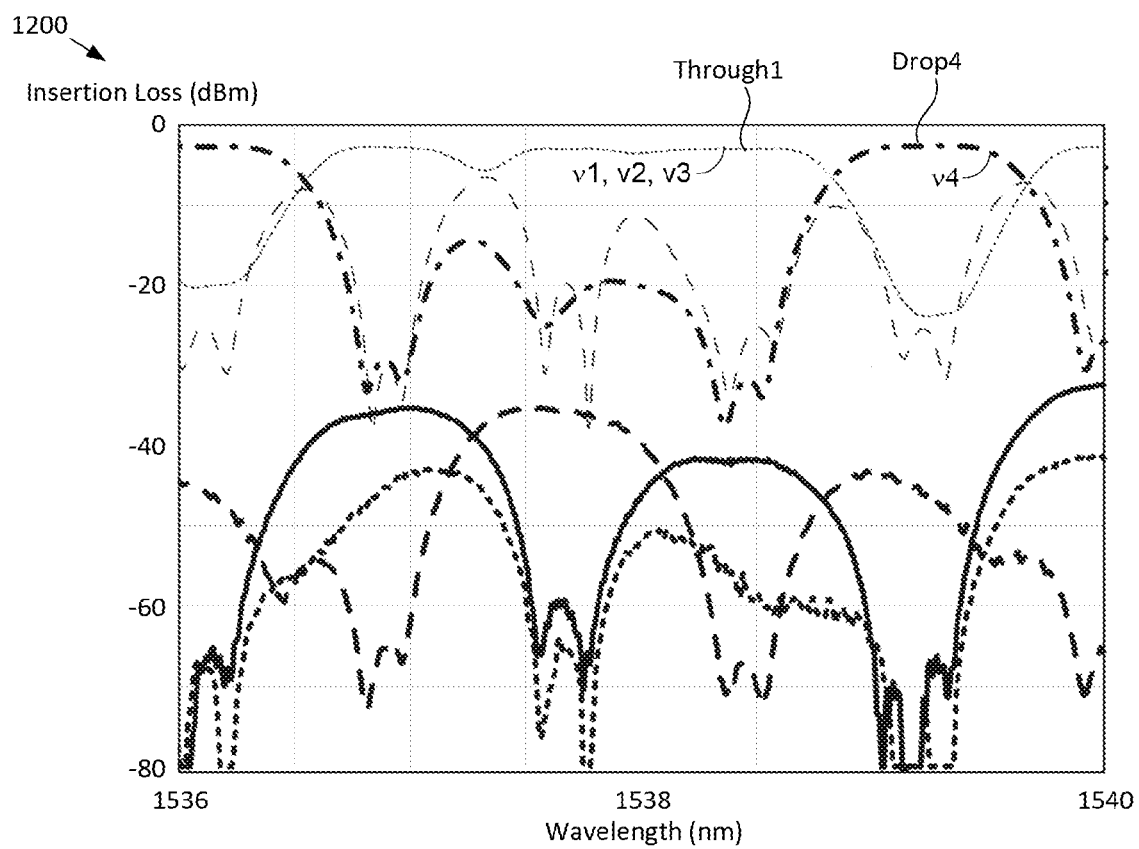
FIG. 12 shows a plot of measured insertion loss for the wavelength signals of input signal 902 for a third exemplary routing configuration of system 900.

FIG. 12 shows a plot of measured insertion loss for the wavelength signals of input signal 902 for a third exemplary routing configuration of system 900. As seen in plot 1200, in the third exemplary configuration, only wavelength signal v4 is dropped from input signal 902 by routing it to port Drop4, while the remaining wavelength signals are directed to port Through1.

FIG. 13 shows a plot of measured insertion loss for the wavelength signals of input signal 902 for a fourth exemplary routing configuration of system 900. As seen in plot 1300, in the fourth exemplary configuration, wavelength signals v1 and v2 are dropped from input signal 902 by routing them to ports Drop3 and Drop2, respectively. Wavelength signals v3 and v4 are directed to port Through1.

FIG. 14 shows a plot of measured insertion loss for the wavelength signals of input signal 902 for a fifth exemplary routing configuration of system 900. As seen in plot 1400, in the fifth exemplary configuration, wavelength signals v1, v3, and v4 are dropped from input signal 902 by routing them to ports Drop3, Drop1, and Drop4, respectively, while wavelength signal v2 is directed to port Through1.

As evinced by plots 1000, 1100, 1200, 1300, and 1400, reconfiguration of the path of virtually any or all wavelength signals of a WDM signal received by a switching system in accordance with the present disclosure can be realized without significant optical loss or deleterious effect on the flat-top response for each wavelength signal.

It is to be understood that the disclosure teaches just one example of the illustrative embodiment and that many variations of embodiments in accordance with the present disclosure can easily be devised by those skilled in the art after reading this disclosure and that the scope of the present invention is to be determined by the following claims.

What is claimed is:

1. An integrated-optics system comprising a first frequency-filter block, the frequency-filter block including:
   first and second input ports;
   first and second output ports;
   a first Mach-Zehnder Interferometer (MZI);
   a second MZI; and
   first, second, and third tunable couplers;
   wherein the first MZI, second MZI and the first, second, and third tunable couplers are optically coupled and monolithically integrated on a substrate and arranged such that the first MZI is between the first and second tunable couplers and the second MZI is between the second and third tunable couplers;
   wherein the first frequency-filter block is operative for independently directing each of a first plurality of wavelength signals from the either of the first and second input ports to either of the first and second output ports; and
   wherein the frequency-filter block is characterized by a flat-top response for each wavelength signal of the first plurality thereof.

2. The system of claim 1:
   wherein each of the first and second MZI includes:
   a first arm;
   a second arm; and
   a first phase controller that is configured to control the phase of an optical signal propagating through the first arm; and
   wherein each of the first, second, and third tunable couplers includes:
   a third arm;
   a fourth arm; and
   a second phase controller that is configured to control the coupling ratio between the third and fourth arms.

3. The system of claim 2 wherein the first MZI is characterized by a first path-length difference between its respective first and second arms, and wherein the second MZI is characterized by a second path-length difference between its respective first and second arms, and further wherein the first path-length difference is different than the second path-length difference.

4. The system of claim 2 wherein at least one of the first phase controller and the second phase controller is a low-power phase controller.

5. The system of claim 4 wherein the first phase controller comprises a first phase-control element disposed on the first arm, and wherein the first phase-control element includes:
   a first electrode;
   a second electrode; and
   a first piezoelectric layer that is between the first and second electrodes;
   wherein the first phase-control element is operative for controlling a stress in the first arm to induce a phase shift on a first optical signal propagating through the first arm, the phase shift being within the range of 0 radians to $2\pi$ radians.

6. The system of claim 5 wherein the second phase controller comprises a second phase-control element disposed on the third arm, and wherein the second phase-control element includes:
   a first electrode;
   a second electrode; and
   a second piezoelectric layer that is between the first and second electrodes;
   wherein the second phase-control element is operative for controlling a stress in the third arm to induce a phase shift on a second optical signal propagating through the third arm, the phase shift being within the range of 0 radians to $2\pi$ radians.

7. The system of claim 6 wherein the third arm includes (1) a lower cladding having a pedestal, (2) a core that is disposed on the pedestal, and (3) an upper cladding that is conformal with the lower cladding and core to define a projection and a field region, and wherein the second phase-control element is disposed on the projection and field region to define at least one stress-concentration point that is at or below a feature of the core.

8. The system of claim 4 wherein the first phase controller comprises a liquid-crystal element that is configured as a portion of an upper cladding of the first arm, and wherein the liquid-crystal element is operative for inducing a phase shift on the first optical signal, the phase shift being within the range of 0 radians to $2\pi$ radians.

9. The system of claim 1 wherein the system includes a plurality of frequency-filter blocks that includes the first frequency-filter block, the plurality of frequency-filter blocks being optically coupled and monolithically integrated on the substrate, wherein the plurality of frequency-filter blocks is arranged to collectively define a reconfigurable optical add-drop multiplexer comprising:
- a third input port configured to receive a second plurality of wavelength signals;
- a plurality of drop ports;
- a plurality of add ports; and
- a through port;
- wherein the reconfigurable optical add-drop multiplexer is operative for independently directing each of a second plurality of wavelength signals from the third input port to any port selected from the group consisting of the plurality of drop ports and the through port.

10. A method comprising:
(1) providing a first frequency-filter block that includes:
- first and second input ports;
- first and second output ports;
- a first Mach-Zehnder Interferometer (MZI);
- a second MZI; and
- first, second, and third tunable couplers;
- wherein the first MZI, second MZI and the first, second, and third tunable couplers are optically coupled and monolithically integrated on a substrate and arranged such that the first MZI is between the first and second tunable couplers and the second MZI is between the second and third tunable couplers; and
- wherein the frequency-filter block is characterized by a flat-top response for each wavelength signal of the first plurality thereof;

(2) establishing a first path through the first frequency-filter block for a first wavelength signal of a first plurality of wavelength signals, where the first path includes one of the first and second input ports and one of the first and second output ports; and (3) establishing a second path through the first frequency-filter block for a second wavelength signal of the first plurality of wavelength signals, where the second path includes one of the first and second input ports and one of the first and second output ports, and wherein the first and second paths are independent of one another.

11. The method of claim 10:
wherein each of the first and second MZI includes:
(i) a first arm;
(ii) a second arm; and
(iii) a first phase controller that is configured to control the phase of an optical signal propagating through the first arm; and
wherein each of the first, second, and third tunable couplers includes:
(i) a third arm;
(ii) a fourth arm; and
(iii) a second phase controller that is configured to control the coupling ratio between the third and fourth arms.

12. The method of claim 11 wherein the first phase controller is a low-power phase controller that comprises a phase-control element disposed on the first arm, and wherein the phase-control element includes:
(i) a first electrode;
(ii) a second electrode; and
(iii) a piezoelectric layer that is between the first and second electrodes;
wherein the phase-control element is operative for controlling a stress in the first arm to induce a phase shift on an optical signal propagating through the first arm, the phase shift being within the range of 0 radians to $2\pi$ radians.

13. The method of claim 12 wherein the first arm includes (1) a lower cladding having a pedestal, (2) a core that is disposed on the pedestal, and (3) an upper cladding that is conformal with the lower cladding and core to define a projection and a field region, and wherein the first phase-control element is disposed on the projection and field region to define at least one stress-concentration point that is at or below a feature of the core.

14. The method of claim 11 wherein the first phase controller is a low-power phase controller that comprises a liquid-crystal element that is configured as a portion of an upper cladding of the first arm, and wherein the liquid-crystal element is operative for inducing a phase shift on an optical signal propagating through the first arm, the phase shift being within the range of 0 radians to $2\pi$ radians.

15. The method of claim 10 further comprising:
(4) providing an integrated-optics switching system that includes a plurality of frequency-filter blocks that includes the first frequency-filter block, wherein the frequency-filter blocks of the plurality thereof are optically coupled and monolithically integrated on the substrate, and wherein the plurality of frequency-filter blocks is arranged to collectively define a reconfigurable optical add-drop multiplexer comprising:
(i) a third input port configured to receive a second plurality of wavelength signals;
(ii) a plurality of drop ports;
(iii) a plurality of add ports; and
(iv) a through port;
(5) receiving a plurality of wherein the reconfigurable optical add-drop multiplexer is operative for independently directing each of a second plurality of wavelength signals from the third input port to any port selected from the group consisting of the plurality of drop ports and the through port.

* * * * *